July 1, 1969   A. J. FAUSTINI   3,452,780
ELECTRICALLY ACTUATED VALVE
Filed Nov. 12, 1965
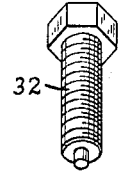
FIG.I.
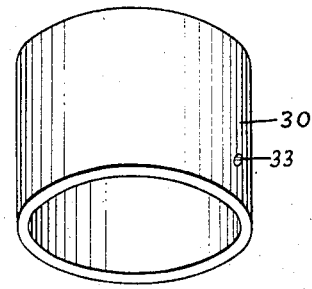
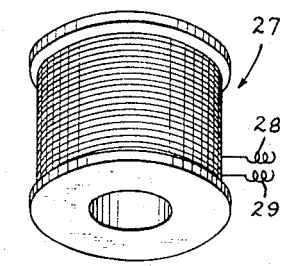
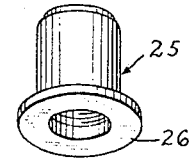
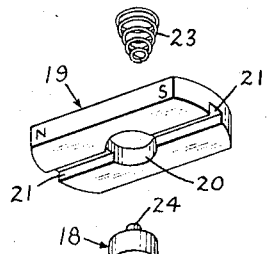
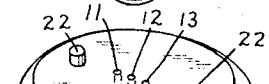
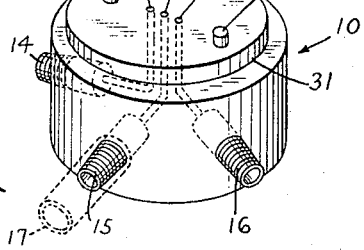
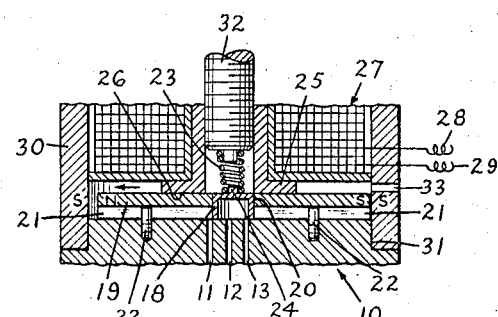
FIG.2.
FIG.3.
INVENTOR
ALBERT J. FAUSTINI
BY
ATTORNEY

United States Patent Office 3,452,780
Patented July 1, 1969

3,452,780
ELECTRICALLY ACTUATED VALVE
Albert J. Faustini, Oakland, Calif., assignor to Warner-Lambert Pharmaceutical Company, Morris Plains, N.J., a corporation of Delaware
Filed Nov. 12, 1965, Ser. No. 507,335
Int. Cl. F16k *11/00*
U.S. Cl. 137—625.48
2 Claims

ABSTRACT OF THE DISCLOSURE

A solenoid actuated multiport slide valve mechanism having a reciprocating manifold carried by a permanently magnetized slide. The slide valve mechanism is capable of venting to the atmosphere if an adjustable predetermined pressure is exceeded.

---

The present invention relates to a novel slide valve mechanism and relates more particularly to a self-seating solenoid actuated multiport slide valve mechanism including a reciprocating manifold carried by a magnetized slide adapted to permit the reciprocatable manifold to remain in any desired operative porting position with or without the application of power to the actuating solenoid.

The use of multiport valving mechanisms for directing fluid flow finds wide application in fluid systems. These systems ordinarily require rapid positive porting action and complete freedom from leakage at operating pressure. At the same time for reasons of safety such fluid pressure systems must also be provided with suitable pressure control devices to enable any excess pressure built up in the system to be released and vented.

Accordingly, it is an important object of this invention to provide a positive action multiport slide valve mechanism for pressurized fluid systems which is capable of toggling at high speed to the desired porting position when actuated by a solenoid and remaining in toggled porting position until reactuated.

Another object of this invention is to provide a slide valve mechanism for pneumatic pressure systems which includes a reciprocating manifold both self-seating and adjustable to various operating pressures yet which, if excess operating pressures are reached, is capable of venting said excess pressure and then reseating itself at a predetermined lower operating pressure.

Yet another object of this invention is the provision of an efficient, economical electrically actuated valving mechanism of simple and rugged construction including a reciprocating manifold self-seating with wear and which can be effectively utilized in either high or low pressure systems depending upon the location of the pressure and exhaust ports.

Other objects of this invention will appear from the following detailed description and the accompanying drawing.

FIG. 1 is a vertical exploded view in perspective of the several elements forming said valve mechanism, including a permanent magnet which when assembled in the sequence illustrated forms the electrically actuated solenoid slide valve of this invention shown in assembled form in FIG. 2;

FIG. 2 is a side-elevational view in section of said novel slide valve mechanism with the valve manifold in the porting position which connects the center pressure port the left port, the right port venting to atmospheric pressure; and FIG. 3 is a partial side-elevational view in section of said slide valve mechanism with said valve manifold in alternate porting position with the center pressure port connected to the right port and the left port vented to the atmosphere.

Like numerals indicate like parts throughout the several views of the drawing.

Referring now to the drawing and more particularly to FIG. 1, the valve mechanism of the present invention comprises a valve body generally indicated by reference numeral 10 through which are drilled a series of ports 11, 12 and 13 communicating with nibs 14, 15 and 16, respectively. In the device as shown, when operated to valve air under pressure or other gas as desired from one port to another, port 12 is the pressure port and is connected by means of tubing 17 to a source of air under pressure such as, for example, a pressure tank. In operation, the respective ports are connected by the alternating reciprocal movement of valve manifold 18, which is designed to be of a width just sufficient to span the distance connecting the two ports. Thus, when valve manifold 18 is in lefthand position as shown in FIG. 2 it serves to connect pressure port 11 with port 12. When valve manifold 18 is in righthand position as shown in FIG. 3 it serves to connect pressure port 12 with port 13.

The reciprocating sliding movement of valve manifold 18 either to the right or to the left is produced by causing a corresponding reciprocate movement of permanent magnet 19. Permanent magnet 19 is provided with a centrally located hole 20 which acts as a housing into which valve manifold 18 fits loosely when the parts are assembled together.

In its lower surface magnet 19 is provided with a keyway or slot 21 adapted to seat on and to receive pins 22 set into valve body 10. This arrangement acts as a guide to permit permanent magnet 19 to move to the right or left when it is subjected to the action of a magnetic field but which prevents rotary or toggling movement about its central axis.

In assembling the several parts shown in exploded view in FIG. 1 valve manifold 18 is seated in hole 20 of permanent magnet 19 and the keyway 21 formed in its base is then seated on pins 22. The narrow end of a helical spring 23 is fitted over a knob 24 on the upper surface of valve manifold 18. Internally threaded cylindrical nut 25 is placed over spring 23 so that shoulder 26 of nut 25 rests on the upper surface of magnet 19. An electromagnetic coil 27 having leads 28 and 29 is placed over the upright stem portion of cylindrical nut 25 so that it surrounds the stem and a cover 30 placed over the whole assembly, the lower portion of the inner surface of the cover 30 being force fitted to the shoulder 31 of valve body 10. Bolt 32 is then threaded into the interior of cylindrical nut 25. When turned a sufficient number of turns bolt 32 ultimately bears on helical spring 23 placing it under compression. By turning bolt 32 a sufficient number of turns either clockwise or counterclockwise a variable and adjustable pressure can thus be exerted on valve manifold 18.

When direct current is supplied to leads 28 and 29 of electromagnetic coil 27 of the electromagnetic field created by the current flowing through the windings of coil 27 forms an electromagnet in which the lower edges of cover 30 are of one polarity, either north or south, and cylindrical nut 25 and shoulder 26 is of the opposite polarity. Since the north and south poles of permanent magnet 19 are fixed, when the direct current flow through coil 27 is such that the polarity of the lower edges of cover 30 is north and that of cylindrical nut 25 south, as shown in FIG. 1, the repulsion of the resulting adjacent north-north poles and the attraction between the adjacent north-south poles causes permanent magnet 19 to toggle quickly to the right. This movement also carries valve manifold 18 to the right which results in connecting pressure port 12 with port 13 as shown in FIG. 3 and the air then flows from port 12 into port 13. By subsequently reversing the direction of the direct current flowing through coil 27 the polarity of the resulting electromagnetical field is reversed. Thus, the opposite north-south poles as shown in FIG. 3 will attract each other and the adjacent north-north poles will repulse each other thus causing permanent magnet 19 to toggle to the left, as shown in FIG. 2, thereby causing valve manifold 18 to connect pressure port 12 with port 11. The action is instantaneous. Since valve manifold 18 is spring biased under the action of spring 23 it is self-seating if the parts undergo wear during operation. Excessive pressure on the system and in valve manifold 18 will cause the manifold to become unseated and vent the excess pressure through a vent hole 33 until the internal pressure becomes equalized with the pressure exerted by spring 23 whereupon valve manifold 18 is again reseated. By designing said valve mechanism so that the high pressure side is on the outer surface of valve manifold 18, vary high operating pressures can be employed without danger of leakage at the valve manifold.

Having described my invention, what I desire to secure by Letters Patent is:

1. In a valve mechanism for selectively connecting a pressure port to another of a plurality of valve ports, the combination comprising a valve body, a plurality of ports in said valve body including a pressure port, a reciprocating manifold cooperating with said valve body and said ports and communicating with said pressure port so as to connect said pressure port to one or another of said valve ports through said manifold in each operating position, solenoid means creating an electromagnetic field when energized a permanent magnet housing said manifold and mounted on guide means for reciprocal horizontal movement in the electromagnetic field of said solenoid means, said permanent magnet and said manifold being enclosed by a cover member, said manifold thereby being adapted to cause the pressure port to communicate with one or another of said other ports as said permanent magnet and manifold are reciprocated under the action of the electromagnetic field of said solenoid and an adjustable spring-biasing means extending through said permanent magnet to a vented region of said cover member, cooperating with said manifold to maintain a sealing pressure on said manifold and the pressure port communicating therewith whereby said manifold becomes unseated when the pressure from the pressure port exerted on the manifold is greater than the adjusted pressure of the spring-biasing means.

2. A valve mechanism according to claim 1 in which the spring-biasing means includes a spring and a threaded bolt bearing on the spring, the rotation of said threaded bolt altering said spring-biasing pressure.

References Cited

UNITED STATES PATENTS 3,203,447   8/1965   Bremner et al. ____ 251—129 X

FOREIGN PATENTS 75,869   5/1953   Denmark.

M. CARY NELSON, *Primary Examiner.*

JOHN R. DWELLE, *Assistant Examiner.*

U.S. Cl. X.R.

137—625.65; 251—141